(12) United States Patent
Weingarden

(10) Patent No.: US 8,401,895 B2
(45) Date of Patent: Mar. 19, 2013

(54) PRE-EXISTING LIABILITY PAYMENT AND REWARD SYSTEM AND METHOD OF USE

(75) Inventor: Eliyahu Weingarden, Southfield, MI (US)

(73) Assignee: Patented Rewards Cards, LLC, Southfield, MI (US)

( * ) Notice: Subject to any disclaimer, the term of this patent is extended or adjusted under 35 U.S.C. 154(b) by 644 days.

(21) Appl. No.: 12/156,922

(22) Filed: Jun. 5, 2008

(65) Prior Publication Data

US 2009/0083153 A1 Mar. 26, 2009

(51) Int. Cl.
*G06Q 40/00* (2006.01)
(52) U.S. Cl. .......................................... 705/14; 705/30
(58) Field of Classification Search ............... 705/10–44
See application file for complete search history.

(56) References Cited

U.S. PATENT DOCUMENTS

| | | | |
|---|---|---|---|
| 6,345,261 B1 * | 2/2002 | Feidelson et al. | 705/14.18 |
| 6,631,358 B1 | 10/2003 | Ogilvie | |
| 7,054,830 B1 * | 5/2006 | Eggleston et al. | 705/14.26 |
| 7,318,049 B2 * | 1/2008 | Iannacci | 705/39 |
| 7,660,737 B1 * | 2/2010 | Lim et al. | 705/14.49 |
| 7,856,377 B2 * | 12/2010 | Cohagan et al. | 705/14.3 |
| 2002/0084917 A1 | 7/2002 | Hauptman et al. | |
| 2004/0243468 A1 * | 12/2004 | Cohagan et al. | 705/14 |
| 2006/0259364 A1 | 11/2006 | Strock et al. | |
| 2007/0011089 A1 | 1/2007 | DeSchryver | |
| 2007/0106581 A1 | 5/2007 | Mitchell et al. | |
| 2007/0192178 A1 | 8/2007 | Fung et al. | |
| 2012/0265593 A1 * | 10/2012 | Etheredge et al. | 705/14.17 |
| 2012/0271689 A1 * | 10/2012 | Etheredge et al. | 705/14.13 |

FOREIGN PATENT DOCUMENTS

WO  WO 94/04979  *  3/1994

\* cited by examiner

*Primary Examiner* — Frantzy Poinvil
(74) *Attorney, Agent, or Firm* — L.C. Begin & Associates, PLLC.

(57) ABSTRACT

A pre-existing liability payment and reward system including a user communication module in communication with a pre-existing liability holder; a merchant communication module that transacts with the user communication module and a processing communication module; a processing communication module that communicates with the merchant communication module and a provider communication module; a provider calculation module that determines a reward; a provider communication module in communication with the provider calculation module; a system calculation module that determines a reward and communicates with a system communication module; a system communication module in communication with a system calculation module; a holder calculation module managing a pre-existing liability holder user account; and a holder communication module in communication with a user communication module and the system communication module. A method of use is also provided.

20 Claims, 9 Drawing Sheets

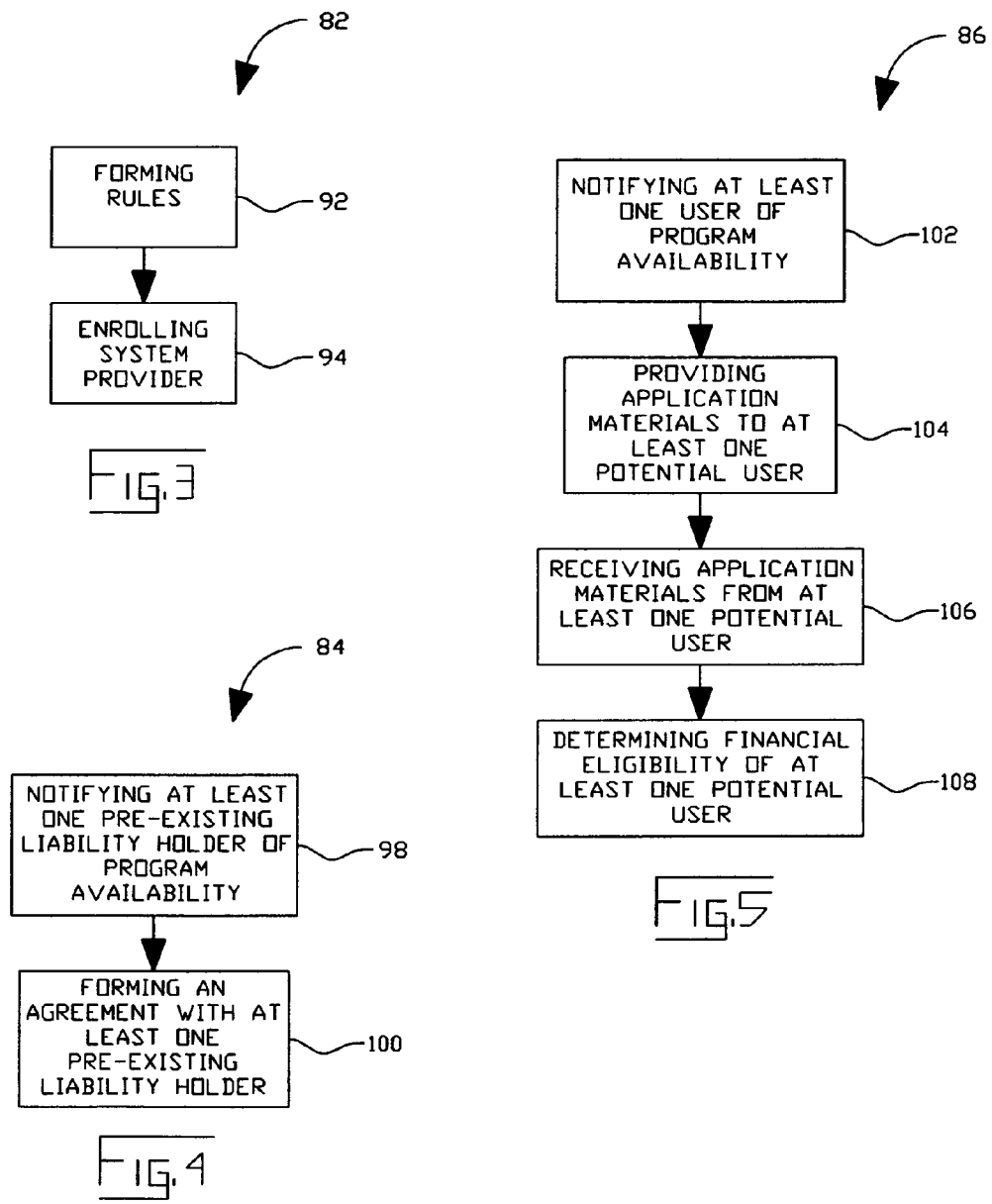

US 8,401,895 B2

PRE-EXISTING LIABILITY PAYMENT AND REWARD SYSTEM AND METHOD OF USE

FIELD OF THE INVENTION

The present invention generally relates to providing rewards to users of revolving credit accounts, and more particularly to providing rewards that reduce a pre-existing liability associated with a user.

BACKGROUND OF THE INVENTION

The present invention provides a system and method for directing funds on behalf of a user as a means of reducing, either in whole or in part, a pre-existing liability as a beneficial side-effect of a transaction that is primarily directed toward another goal, such as the purchase of merchandise or services.

Systems and methods that provide rewards are disclosed in: US Pat. Pub. No. 2007/0192178 A1 issued in the name of Fung et al.; US Pat. Pub. No. 2007/0106581 issued in the name of Mitchell et al.; US Pub. No. 2002/0084917 A1 issued in the name of Hauptman et al.; and U.S. Pat. No. 6,631,358 B1 issued in the name of Ogilive.

Present credit card reward systems oftentimes fail to include an effective means of directly marketing the credit card reward systems to potential users having available credit and to potential users that will be interested in joining the credit card rewards system. Thus, a need exists for a system and method that provides an effective means of directly marketing a credit card reward system to potential users that have available credit and that the potential users will be interested in joining.

Present credit card reward systems may also expend a great deal of money upon advertising, mailing, and marketing. Therefore, a need exists for a credit card reward system that provides decreased costs associated with advertising, mailing, and marketing.

Due to present economic conditions, there are a large number of property owners that are encountering difficulty in timely and fully paying property taxes assessed by a municipality or county. Consequently, many municipalities and counties are not receiving the full amounts of tax revenues upon which they depend to provide services to residents. Therefore, the need exists for a system that will help property owners set aside money to use in paying their property taxes, thereby providing increased tax revenues for municipalities and counties.

Many elected officials, including city, state, and federal officials, are constantly searching for ways to reduce the tax liabilities of citizens without reducing the services available to the citizens. Thus, a need exists for a means of providing a reduction in the tax liabilities of citizens, while at the same time maintaining the levels and quality of services available to citizens.

While existing systems and methods suit their intended purposes, the need remains for a system and method for directing funds, through existing credit systems and structures, on behalf of a user as a means of reducing, either in whole or in part, a pre-existing liability as a beneficial side-effect of a transaction that is primarily directed toward another goal.

SUMMARY

A pre-existing liability payment and reward system including a user communication module in operative communication with each of at least one pre-existing liability holder and at least one merchant associated therewith; a merchant communication module that operates to transact with the user communication module in operative communication with at least one user communication module and a processing communication module associated therewith; a processing communication module that operates to communicate with the merchant communication module and a provider communication module; a provider calculation module that operates to determine a reward resulting from a transaction and is in operative communication with a provider communication module; a provider communication module in operative communication with and adapted to communicate with each of the provider calculation module, and a system communication module; a system calculation module that operates to determine a reward resulting from a transaction and is operative communication with a system communication module; a system communication module in operative communication and adapted to communicate with each of at least one system calculation module and at least one holder communication module; a holder calculation module adapted to manage at least one pre-existing liability holder user account and in operative communication with a holder communication module; and a holder communication module in operative communication with and adapted to communicate with each of at least one user communication module and the system communication module. A method of use is also provided.

BRIEF DESCRIPTION OF THE DRAWINGS

FIG. 3 illustrates a method of forming a rewards program in accordance with one embodiment of the invention.

FIG. 4 illustrates a method of enrolling at least one pre-existing liability holder in a rewards program in accordance with one embodiment of the invention.

FIG. 5 illustrates a method of enrolling at least one user in a rewards program in accordance with one embodiment of the invention.

DETAILED DESCRIPTION OF THE INVENTION

Figure 1:
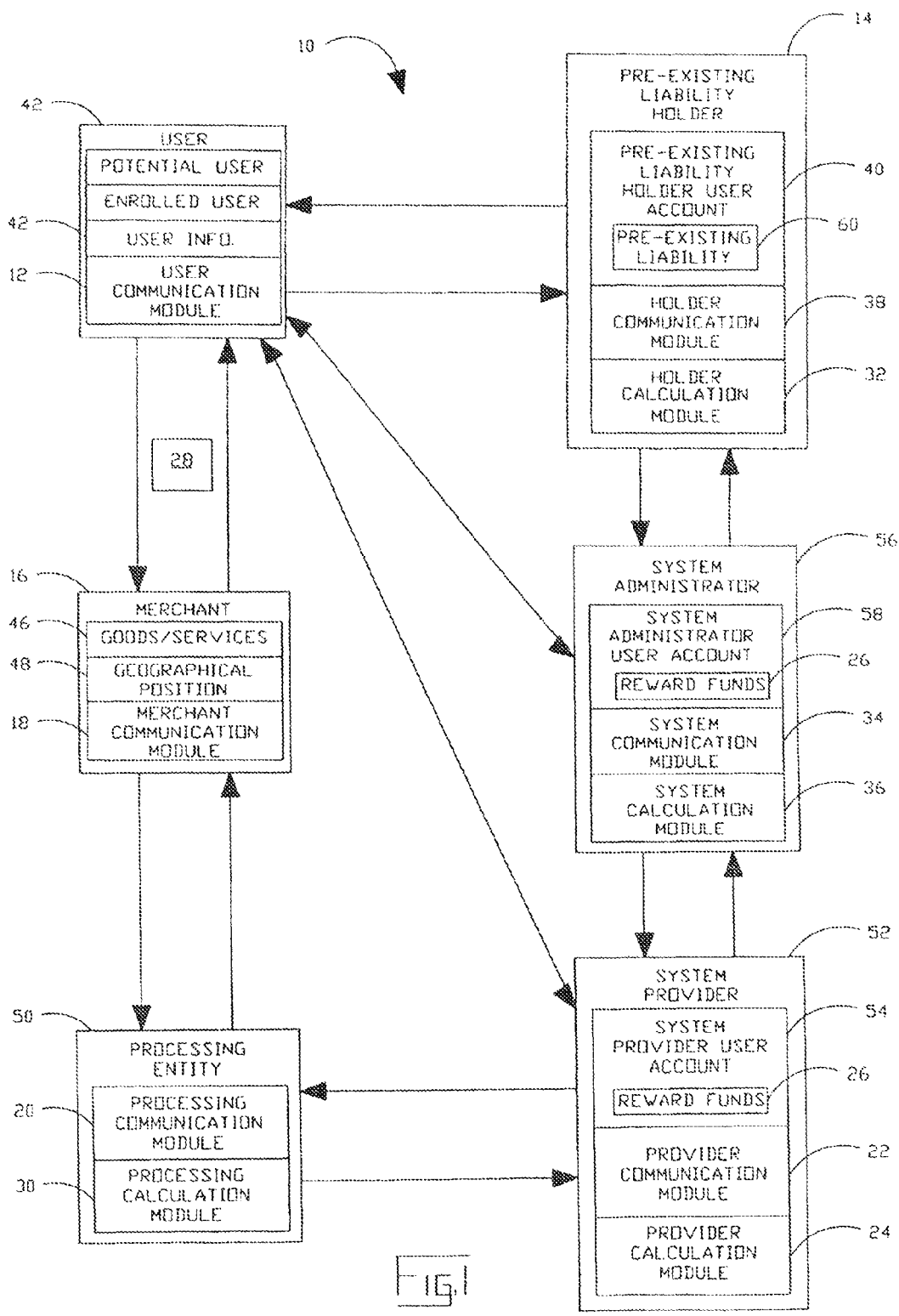
FIG. 1 illustrates a pre-existing liability payment and reward system in accordance with one embodiment of the invention.

The invention provides a means of effectively marketing a credit card reward system to potential users having available credit and who will be interested in joining the credit card rewards system by providing potential users with a credit card offer included in a tax mailing from a municipality. By providing the offer to users owning taxable property, the invention targets potential users likely to have available credit, and users likely to be interested in joining a program aimed at a reduction of a tax liability.

By including the credit card rewards program offer in a mailing that is already to be sent, the invention eliminates the need for a separate mailing containing the offer, whereby considerable expense is saved in time, labor, and shipping costs normally associated with credit card rewards offer mailings.

The invention provides a system that will help property owners set aside money to use in paying their property taxes, thereby providing increased tax revenues for municipalities and counties by applying rewards earned through use of the system towards a reduction in a user's tax liability.

The invention provides a means for elected officials to provide a means of reducing the tax liabilities of citizens, while at the same time maintaining the levels and quality of services available to the citizens without reducing revenues available.

Definitions

The following definitions are provided to facilitate an understanding of the written description. The definitions provided herein are not intended to be limited to the examples set forth herewith, but rather are intended to be illustrative and exemplary.

As defined herein, the term "user" means any individual, associate of an individual, group of individuals, business entity, legal entity, organization, charity group, or any group or combination of any of the foregoing who share or are associated with another having a pre-existing liability, either in part or in whole.

As defined herein, the term "user information" means any and all information associated with a user. Such information may include, but is not limited to: name, address, social security number, state identification numbers, driver's license number, driving record, financial records, credit reports, addresses of properties associated with a user and with a property tax, and the like.

As defined herein, the term "merchant" means any individual, associate of an individual, group of individuals, business entity, legal entity, organization, charity group, or any group or combination of any of the foregoing offering for sale, exchange, or barter, any goods or services to a user, and accepting a credit card as means of payment for the goods or services.

As defined herein, the term "geographical position" means the physical location upon Earth of a user, a merchant, or a transaction taking place between a user and a merchant.

As defined herein, the term "processing entity" means any entity, either in existence or yet to come into existence, that provides intermediary handling services between the point of a transaction and a system provider.

As defined herein, the term "system provider" means a bank or other institution that provides credit to a user and facilitates collection and payment of funds and rewards, as is well known in the art.

As defined herein, the term "system administrator" means any individual, associate of an individual, group of individuals, business entity, legal entity, organization, charity group, or any group or combination of any of the foregoing that provides services including administration and distribution of rewards created by the system described herein.

As defined herein, the term "pre-existing liability holder" means any individual, associate of an individual, group of individuals, business entity, legal entity, organization, charity group, or any group or combination of any of the foregoing that holds a financial liability against another or who holds a financial liability against another on the behalf of another. The liability may be a recurring liability, such as a periodic bill, a one-time liability, or any combination thereof.

As defined herein, the term "pre-existing liability" means any financial liability that may exist or come into existence and that is owed to one entity by another entity because of a relationship between the respective entities.

As defined herein, the term "rewards" means an amount of money determined as a function of a total amount of a transaction conducted using consumer and business credit accounts as are well known in the art. The amount of money may be determined as a predefined percentage of a total transaction amount, a predefined amount of money per transaction, or any combination thereof.

As defined herein, the term "module" means one or more units, people, or any combination thereof capable of processing or evaluating signals input into or stored within the module. Each module may be a stand-alone unit or a plurality of units comprising hardware, software, or any combination thereof.

As defined herein, the term "credit card" means any transactional payment system wherein a merchant accepts as a form of payment a credit card, debit card, pre-paid gift card, or other means of payment whereby the merchant, in accepting the payment, pays a discount rate or other associated fee.

In one embodiment of the invention, a pre-existing liability payment and reward system 10 includes a user communication module 12 that receives data from a user 42 in operative communication with each of at least one pre-existing liability holder 14 and at least one merchant 16 associated therewith; a merchant communication module 18 that operates to transact with the user communication module 12 in operative communication with at least one user communication module 12 and a processing communication module 20 associated therewith; a processing communication module 20 that operates to communicate with the merchant communication module 18 and a provider communication module 22; a provider calculation module 24 that operates to determine an initial reward 26 resulting from a transaction 28 and is in operative communication with a provider communication module 22, and a provider communication module 22 in operative communication with and adapted to communicate with each of the processing calculation module 30, and a system communication module 34; a system calculation module 36 that operates to determine a user reward 26 resulting from a transaction 28 and is in operative communication with a system communication module 34, and a system communication module 34 in operative communication and adapted to communicate with each of at least one system calculation module 36 and at least one holder communication module 38; a holder calculation module 32 adapted to manage at least one pre-existing liability holder user account 40 and in operative communication with a holder communication module 38; and a holder communication module 38 in operative communication with and adapted to communicate with each of at least one user communication module 12 and the system communication module 34.

Referring now to the drawings, FIG. 1 illustrates one embodiment of a pre-existing liability payment and reward system 10, the system 10 including a plurality of users 42, each respective user 42 having user info 44, a user account, and a user communication module 12 in operative communication with each of at least one pre-existing liability holder 14 and at least one merchant 16 associated therewith; a plurality of merchants 16, each respective merchant 16 having goods or services 46, a geographical position 48, and a merchant communication module 18 in operative communication with at least one user 42 and a processing entity 50 associated therewith; a processing entity 50, the processing entity 50 having a processing calculation module 30 and a processing communication module 20 in operative communication with at least one user 42 and at least one system provider 52 associated therewith; a system provider 52, the system provider 52 having a plurality of system provider user accounts 54; rewards 26; a provider calculation module 24, and a provider communication module 22 in operative communication with the processing entity 50 and a system administrator 56 associated therewith; a system administrator 56, the system administrator 56 having a plurality of system administrator user accounts 58; rewards 26; a system calculation module 36, and a system communication module 34 in operative communication with at least one system provider 52 and at least one pre-existing liability holder 14 associated therewith; and a pre-existing liability holder 14, the pre-existing liability holder 14 having a plurality of pre-existing liability holder user accounts 40, with each respective pre-existing liability holder user account 40 including at least one pre-existing liability 60, a holder calculation module 32 adapted to manage at least one pre-existing liability holder user account 40, and a holder communication module 38 in operative communication with at least one user 42 and the system administrator 56 associated therewith.

In another embodiment of the invention, the provider communication module 22 may be in operative communication with at least one holder communication module 38.

In one embodiment of the invention, the pre-existing liability holder 14 may include, but is not limited to: a municipality, a state, or county.

In one embodiment of the invention, the pre-existing liability 60 may include, but is not limited to: property taxes associated with at least one parcel of property within a municipality.

In one embodiment of the invention, the user 42 may include, but is not limited to: a resident of a municipality having at least one parcel of property within the municipality.

In another embodiment of the invention, the system 10 may include a plurality of users 42, wherein each respective user 42 of the plurality of users 42 is a resident of a municipality having at least one parcel of property within the municipality.

Figure 2:
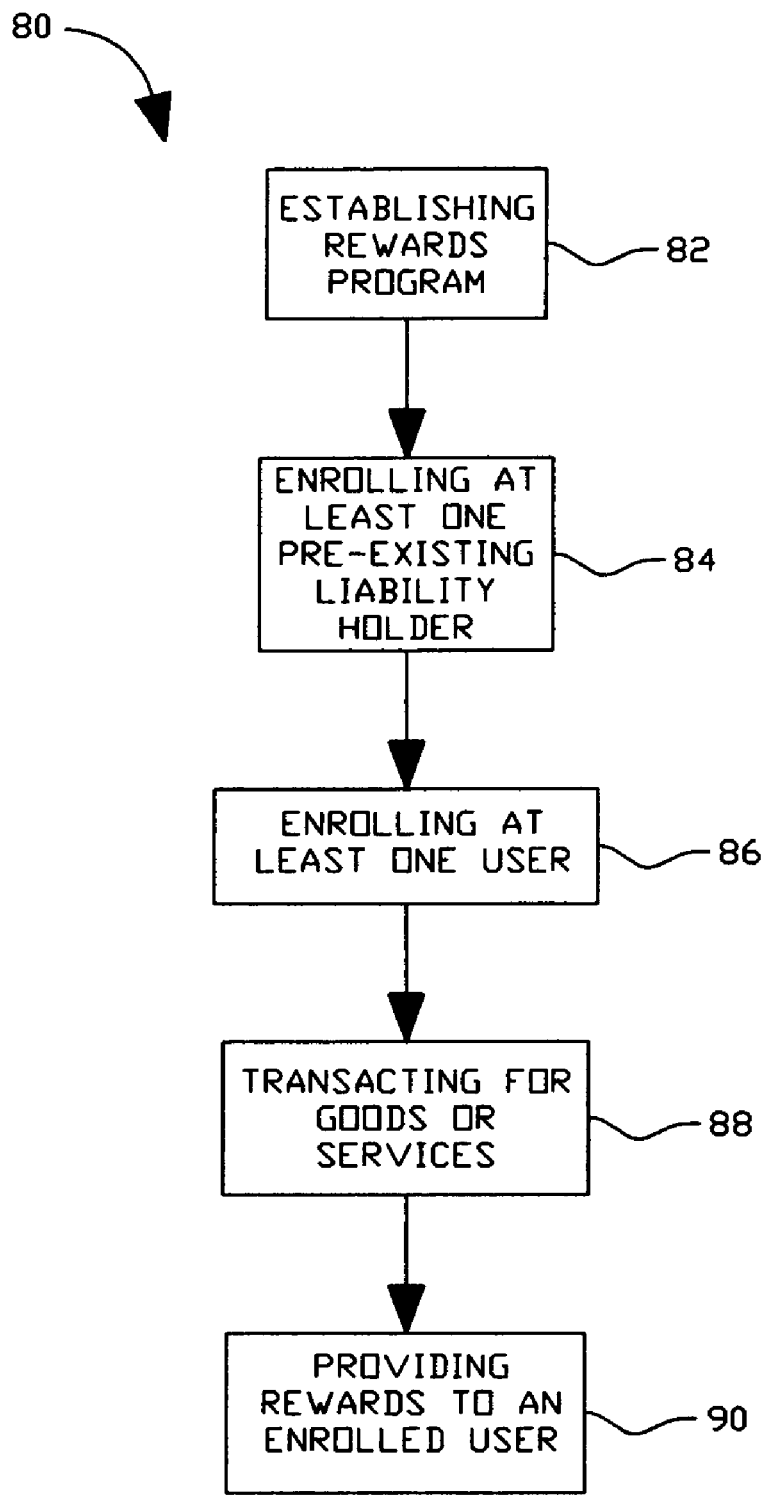
FIG. 2 illustrates a method of using a pre-existing liability payment and reward system in accordance with one embodiment of the invention.

FIG. 2 illustrates a method of using the system 80 illustrated in FIG. 1. In one embodiment of the invention, the method of using a pre-existing liability payment and reward system 80 includes: establishing a rewards program (82); enrolling at least one pre-existing liability holder 14 the rewards program (84); enrolling at least one user 42 in the rewards program (86); transacting for goods or services 46 by a user 42 from a merchant 16 (88); and providing rewards 26 to a user 42 at a predetermined time after the transaction 28 is completed (90).

In an embodiment of the invention, the rewards program may be established by a system administrator 56 (82).

In another embodiment of the invention, the rewards program may be established by a pre-existing liability holder 14 (82).

In another embodiment of the invention, the rewards program may be established by a processing entity 50 (82).

In another embodiment of the invention, the rewards program may be established by a system provider 52 (82).

In the embodiment of the invention illustrated in FIG. 3, the system calculation module 36 operates to establish a rewards system 10 (82). Establishing a rewards system 10 (82) may include forming rules (92) that govern transactions 28, transaction funds, rewards funds 26; and enrolling a system provider 52 (96), the system provider 52 operating to provide the services described above.

In the embodiment of the invention illustrated in FIG. 4, the system communication module 34 operates to enroll at least one pre-existing liability holder 14 (84). Enrolling at least one pre-existing liability holder 14 (84) may include the system communication module 34 communicating with at least one holder communication module 38, to notify at least one pre-existing liability holder 14 of program availability (98); and forming an agreement with at least one pre-existing liability holder 14 (100), the agreement operating to establish pre-existing liability holder 14 obligations with respect to the rewards program.

In the embodiment of the invention illustrated in FIG. 5, enrolling at least one user 42 (84) may include the holder communication module 38 operating to communicate with the user communication module 12, thereby notifying at least one potential user 42 of program availability (102); the holder communication module 38 operating to communicate with the user communication module 12, thereby providing application materials to at least one potential user 42 (104); the user communication module 12 communicating with the provider communication module 22, whereby the provider communication module 22 operates to receive application materials from at least one potential user 42 (106); the provider communication module 22 operating to communicate with the provider calculation module 22, the provider calculation module 24 operating to determine financial eligibility of at least one potential user 42 (108); and the provider communication module 22 operating to communicate with each of the user communication module 12 and the holder communication module 38, thereby notifying each of the user 42 and the pre-existing liability holder 14 of acceptable application materials, thereby enrolling at least one potential user 42 (86), whereby the at least one potential user 42 becomes an enrolled user 42.

In one embodiment of the invention, the holder communication module 38 may communicate with the user communication module 12 by means including, but not limited to: postal mail, electronic mail, telephone calls, public postings, internet sites, directed marketing including direct solicitation, advertising.

In another embodiment of the invention, notifying at least one potential user 42 of program availability (102) may include notifying the at least one potential user 42 of program availability via at least one property tax bill or tax assessment associated with the at least one user 42.

In one embodiment of the invention, an enrolled user 42 has associated therewith a pre-existing liability holder user account 40 managed by the holder calculation module 32; a system administrator user account 58 managed by the system calculation module 36, and a system provider user account 54 managed by the provider calculation module 24. Each respective user account may include funds, rewards 26, and personal information, whereby each of the funds, rewards 26, and personal information are associated with a respective user 42 such that the rewards 26 of a respective user 42 may be readily ascertained.

Figure 6:
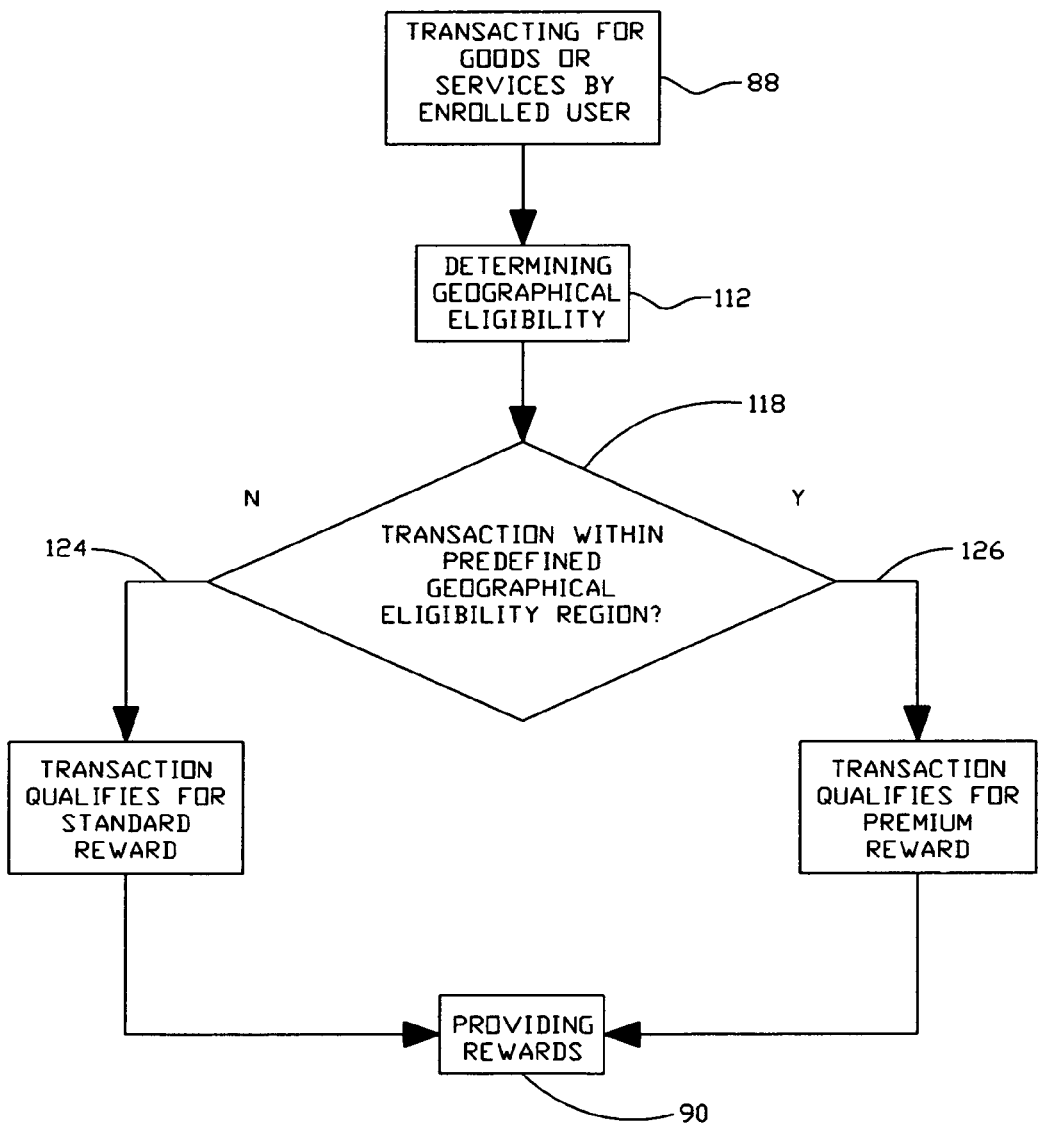
FIG. 6 illustrates a flowchart describing a method of transacting for goods or services and providing rewards as a result of the transaction in accordance with one embodiment of the invention.

In the embodiment of the invention illustrated in FIG. 6, the method of using the system includes transacting for goods or services 46 by an enrolled user 42 (46), whereafter the system calculation module 36 operates to determine geographical eligibility of the transaction 28 (112).

In one embodiment of the invention, transacting for goods or services 46 includes determining geographical eligibility of a transaction 28 (112).

Figure 6A:
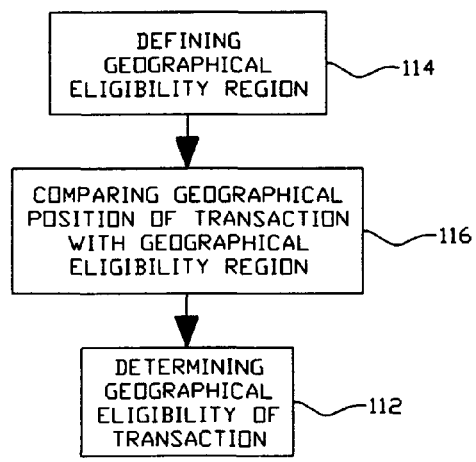
FIG. 6A illustrates a method of determining whether a transaction is within a predefined geographical eligibility region in accordance with one embodiment of the invention.

In the embodiment of the invention illustrated in FIG. 6A, the system calculation module 36 operates to determine geographical eligibility (112) of a transaction 28 by defining a predefined geographical eligibility region 120 (114); comparing the geographical position 48 of a transaction 28 with the predefined geographical eligibility region (116) to determine whether the geographical position 48 of the transaction 28 is within the predefined geographical eligibility region 120; and determining whether the geographical position 48 of the transaction 28 is within the predefined geographical eligibility region 120 (118); and determining a reward 26 type for the transaction 28.

In another embodiment of the invention, the system calculation module 36 operates to determine the geographical eligibility of a transaction 28 (112) may take place at any other time prior to providing an enrolled user 42 with rewards 26 (90).

In another embodiment of the invention, the provider communication module 22 operates to communicate the geographical position 48 of a transaction 28 to the system calculation module 36, whereby the system calculation module 36 operates to determine the geographical eligibility of a transaction 28 (112).

Figure 6B:
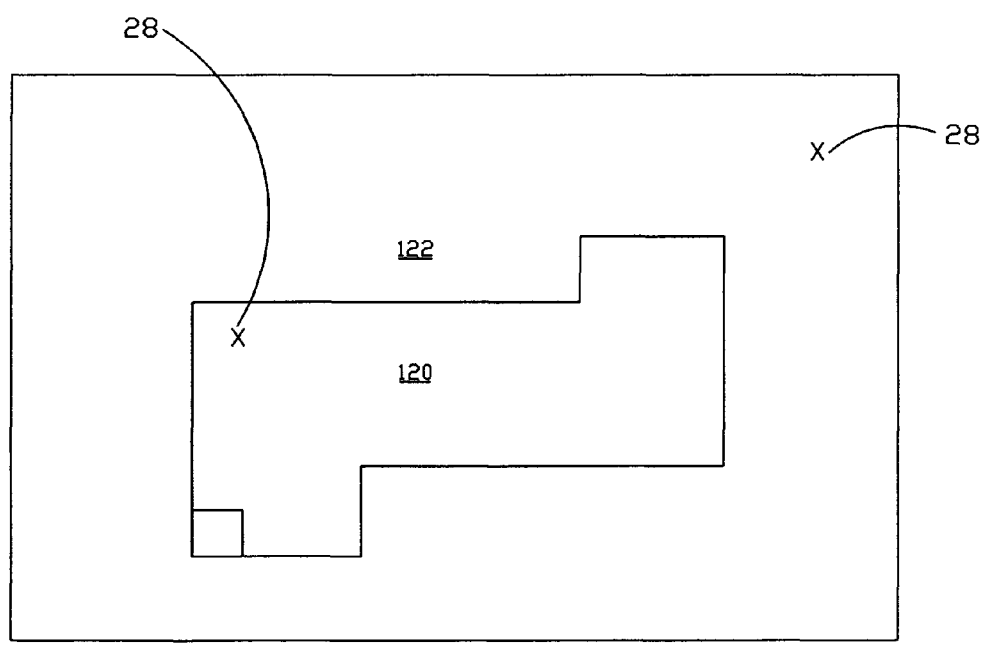
FIG. 6B illustrates a predefined geographical eligibility region in accordance with one embodiment of the invention.

In one embodiment of the invention, illustrated in FIG. 6B, the predefined geographical eligibility region 120 may correspond to city limits of a municipality. In this embodiment of the invention, transactions 28 occurring within the city limits are transactions 28 within the predefined geographical eligibility region 120, and transactions 28 occurring outside of the city limits are transactions 28 within the predefined geographically ineligible region 122.

Referring again to FIG. 6, if the system calculation module 36 determines that transaction 28 is not within the predefined geographical eligibility region 120 (124), the system calculation module 36 then operates to determine that the transaction 28 qualifies for a standard reward 26.

In one embodiment of the invention, a standard reward 26 is provided if the transaction 28 is not within the predefined geographical eligibility region 120.

In one embodiment of the invention, the standard reward 26 may be a predefined monetary amount corresponding to a predefined percentage of the amount of the transaction 28.

If the system calculation module 36 determines that the transaction 28 is within the predefined geographical eligibility region 120 (126), the system calculation module 36 determines that the transaction 28 qualifies for a premium reward 26.

In one embodiment of the invention, a premium reward 26 is provided if the transaction 28 is within the predefined geographical eligibility region 120.

In one embodiment of the invention, the premium reward 26 may be a predefined monetary amount corresponding to a predefined percentage of the amount of the transaction 28, the predefined percentage of the premium reward 26 being greater than the predefined percentage associated with the standard reward 26.

In another embodiment of the invention, the provider calculation module 24 may operate to determine the geographical eligibility of a transaction 28 (118) by the same means as the system calculation module 36 described above.

Figure 7:
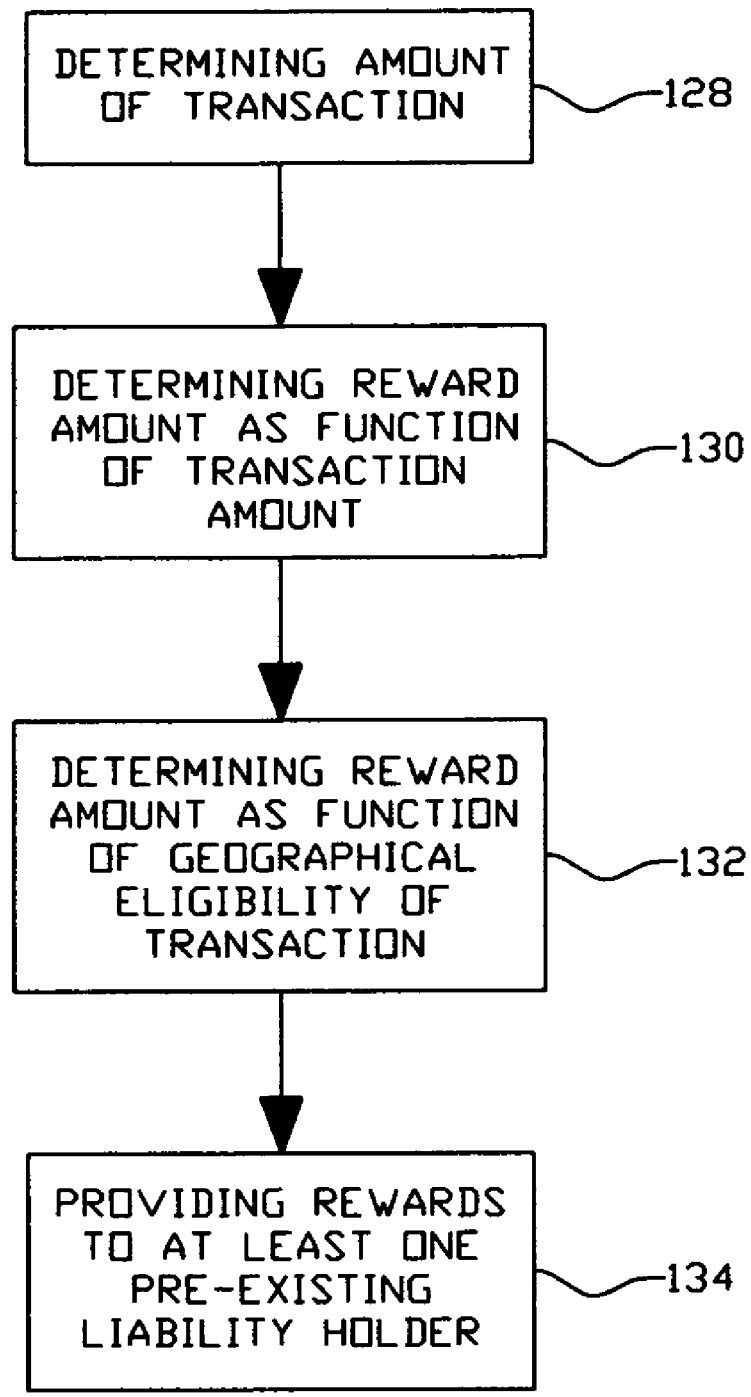
FIG. 7 illustrates a method of providing rewards to at least one pre-existing liability holder in accordance with one embodiment of the invention.

In the embodiment of the invention illustrated in FIG. 7, providing the reward 26 (90) may include the provider calculation module 24 determining the amount of the transaction 28 (128); determining the reward 26 amount as a function of the amount of the transaction 28 (130); determining reward 26 amount as a function of geographical eligibility of transaction 28 (132); and providing rewards 26 to at least one pre-existing liability holder 14 (134) at a predetermined time.

In another embodiment of the invention, providing the reward 26 (90) may include providing the rewards 26 to the system administrator 56 by the system provider 52, whereafter the system administrator 56 provides the rewards 26 to the pre-existing liability holder 14.

Figure 8:
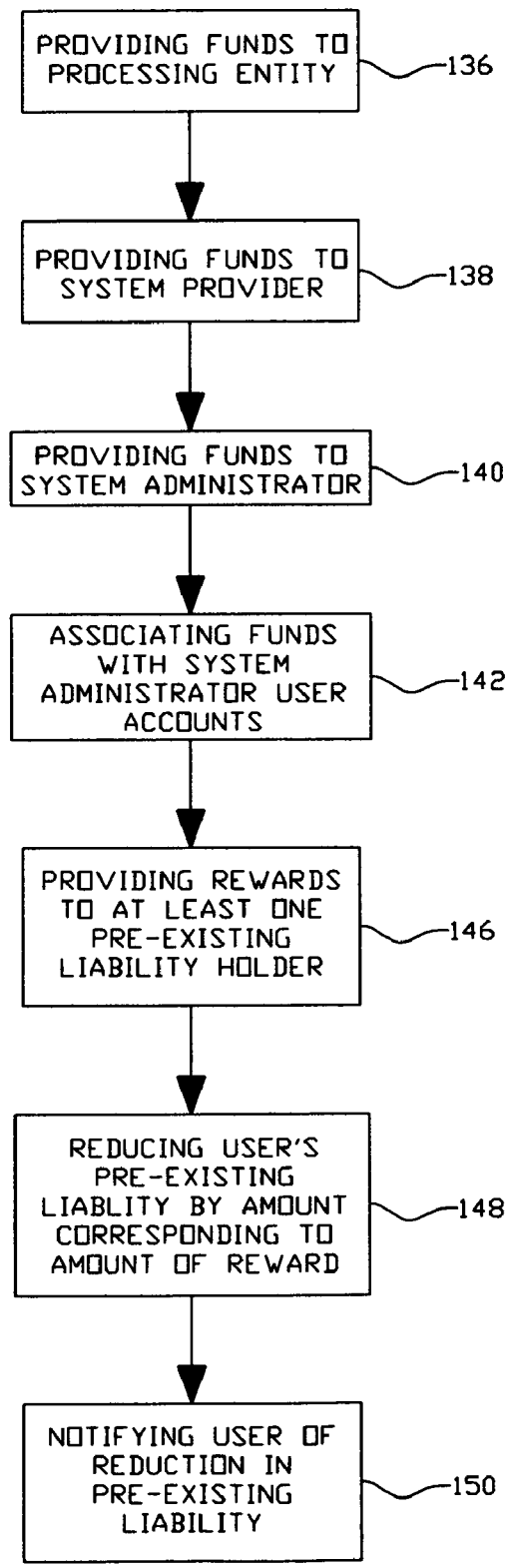
FIG. 8 illustrates a method of reducing a user's pre-existing liability using rewards in accordance with one embodiment of the invention.

In the embodiment of the invention illustrated in FIG. 8, providing the rewards 26 (90) includes the merchant communication module 18 providing funds from a transaction 28 to a processing entity 50 (136); the processing calculation module 30 removing a predefined percentage of the funds corresponding to a predefined processing fee, and the processing communication module 20 of the processing entity 50 then providing the remaining funds to the provider communication module 22 of the system provider 52 (138); the provider calculation module 24 removing a predefined percentage of the funds corresponding to a predefined system provider fee, the provider communication module 22 of the system provider 52 providing funds to the system communication module 34 of the system administrator 56 (140); the system calculation module 36 of the system administrator 56 associating the funds received from the system provider 52 with system administrator user accounts 58 (142), whereafter the funds from the transaction 28 become user rewards 26; the system communication module 34 of the system administrator 56 providing user rewards 26 to the holder communication module 38 of at least one pre-existing liability holder 14 (146); the holder calculation module 32 then reducing a user's 42 pre-existing liability 60 by an amount corresponding to the amount of the user rewards 26 (148); the holder communication module 38 notifying a user 42 of the reduction of the pre-existing liability 60 (150).

In another embodiment of the invention, the system calculation module 36 may operate to remove a predefined percentage of the user rewards 26 associated with each respective user 42 corresponding to a predefined system administrator fee, whereafter the system communication module 34 then operates to provide the remaining rewards 26 to the holder communication module 38.

Figure 9:
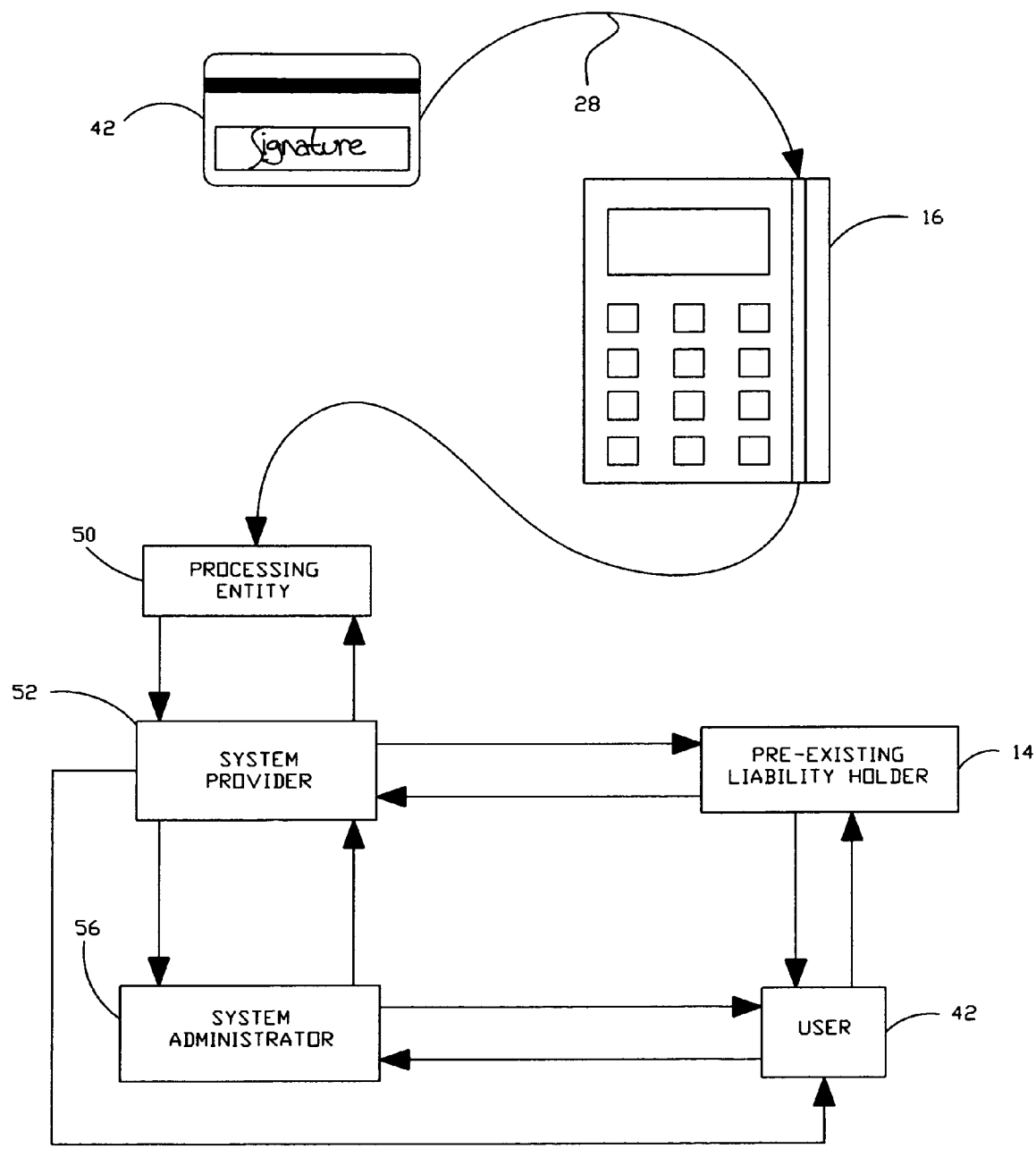
FIG. 9 illustrates a flowchart of a pre-existing liability payment and reward system in accordance with one embodiment of the invention.
Figure 10:
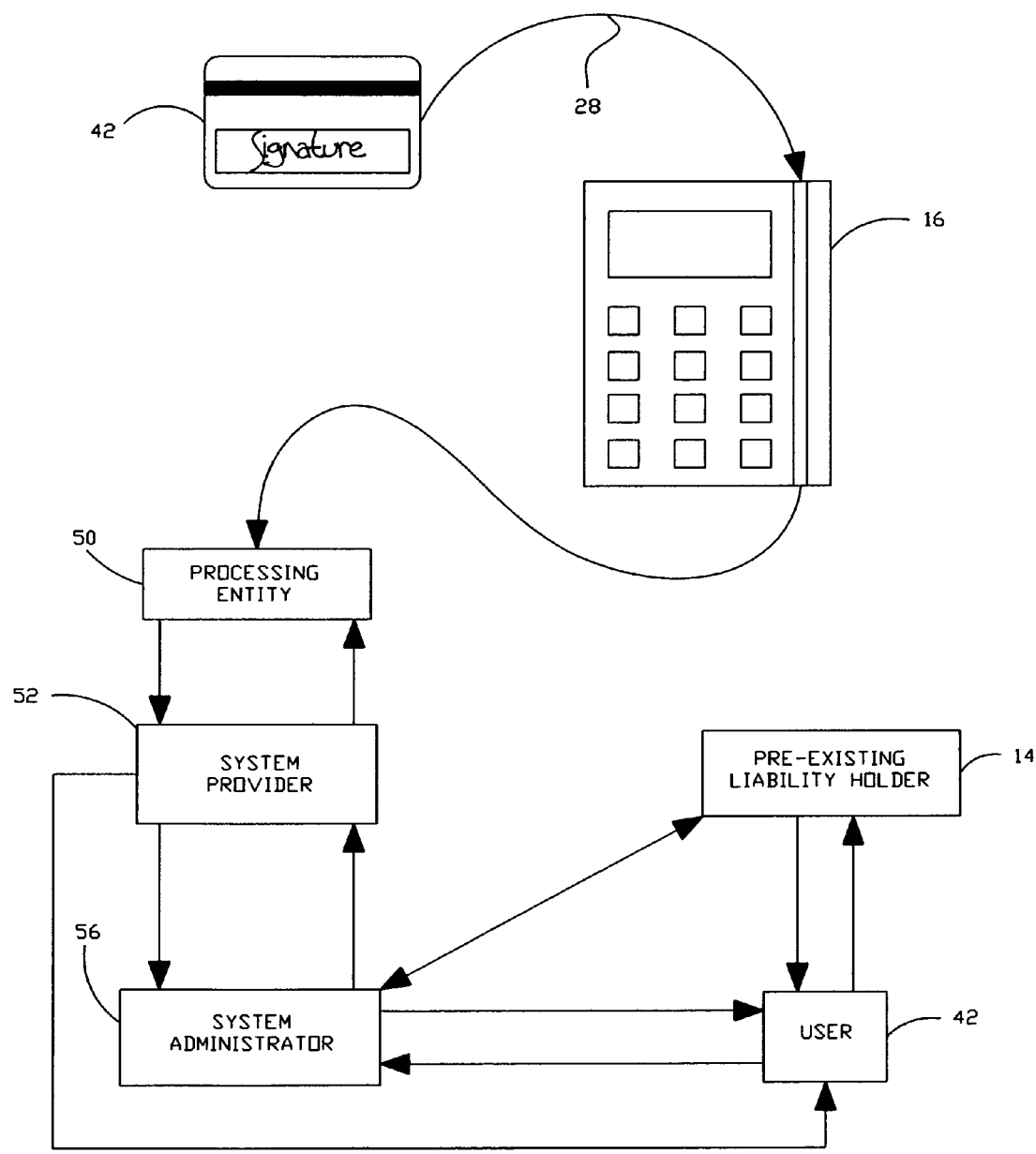
FIG. 10 illustrates a flowchart of a pre-existing liability payment and reward system in accordance with one embodiment of the invention.

FIG. 9 illustrates a flowchart showing generally the method and system described above in the course of a single transaction 28 between a merchant 16 and a user 42.

While several aspects have been presented in the foregoing detailed description, it should be understood that a vast number of variations exist and these aspects are merely an example, and it is not intended to limit the scope, applicability, or configuration of the invention in any way. Rather, the foregoing detailed description provides those of ordinary skill in the art with a convenient guide for implementing a desired aspect of the invention and various changes can be made in the function and arrangements of the aspects of the technology without departing from the spirit and scope of the appended claims.

I claim:

1. A pre-existing liability payment and reward system (10) comprising:
   a user communication module (12) in operative communication with each of a user (42), a pre-existing tax liability holder (14), and a merchant (16) associated therewith, wherein the user (42) owes a pre-existing liability (60) to the pre-existing tax liability holder (14), wherein the pre-existing tax liability holder (14) holds the pre-existing liability (60) that is a financial liability owed by the user (42) to the pre-existing liability holder (14) because of pre-existing relationship between the pre-existing liability holder (14) and the user (42), and wherein the pre-existing liability holder (14) has a plurality of pre-existing liability holder user accounts (40), with each respective pre-existing liability holder user account (40) including the the pre-existing liability (60) and wherein the user communication module (12) is in communication with a system provider (52) that provides credit to the user (42) and facilitates collection and payment of funds and rewards;

a merchant communication module (18) in communication with the merchant (16) that operates to transact with the user communication module (12) in operative communication with the user communication module (12) and a processing communication module (20) associated therewith, wherein the merchant (16) offers for sale, exchange, or barter, goods or services (46) to the user (42), and accepts a credit card as a form of payment for the goods or services (46);

said processing communication module (20) provided by a processing entity (50) that operates to communicate with the merchant communication module (18), and a processing calculation module (30) that processes information received from the merchant (16);

a provider calculation module (24) that operates to determine a reward resulting from information from the processing entity (50), wherein the processing entity (50) receives transaction information from the merchant communication module (18) resulting from a transaction (28) between the user (42) and the merchant (16) and is in operative communication with a provider communication module (22);

the provider communication module (22) in communication with the system provider (52) and in operative communication with each of the provider calculation module (24), and a system communication module (34);

a system calculation module (36) operates to determine a reward based on in received from the processing calculation module (30) resulting from the transaction (28) between the user (42) and the merchant (16) and is in operative communication with the system communication module (34);

the system communication module (34) in operative communication with each of the system calculation modules (36) and a holder communication module (38);

a holder calculation module (32) manages each pre-existing liability holder user account (40) and reduces the user's (42) at least one pre-existing liability (60) by an amount corresponding to an amount of the reward and in operative communication with the holder communication module (38); and the holder communication module (38) in operative communication with each of the user communication module (12) and the system communication module (34), wherein the holder communication module (38) communicates with the user communication module (12) to notify the user (42) of the reduction of the at least one pre-existing liability (60) owed by the user (42) to the pre-existing liability holder (14), and wherein each of the user communication module (12), merchant communication module (18), processing communication module (20), provider communication module (22), provider calculation module (24), system communication module (34), system calculation module (36), holder calculation module (32), and holder communication module (38) includes a combination of hardware and software for processing or evaluating input data into or stored within each respective module.

2. The pre-existing liability payment and reward system of claim 1, further comprising:
the provider communication module (22) in operation communication with at least one holder communication module (38).

3. The pre-existing liability payment and reward system (10) of claim 1, wherein the pre-existing tax liability holder (14) comprises:
a municipality, a state, or a county.

4. The pre-existing liability payment and reward system (10) of claim 1, wherein the at least one pre-existing liability comprises:
at least one property tax associated with at least one parcel of property.

5. The pre-existing liability payment and reward system (10) of claim 1, further comprising:
a plurality of users, wherein each respective user of the plurality of users is a resident of a municipality having at least one parcel of property within the municipality.

6. A method of using a pre-existing liability payment and reward system (10) comprising:
establishing a rewards program (82);
enrolling, a pre-existing tax liability holder (14) in the rewards program, wherein the pre-existing tax liability holder (14) holds at least one pre-existing liability (60) that is a financial liability owed by a user (42) to the pre-existing tax liability holder (14) because of a pre-existing relationship between the pre-existing tax liability holder (14) and the user (42), and wherein the pre-existing tax liability holder (14) has a plurality of pre-existing liability holder user accounts (40), with each respective pre-existing liability holder user account (40) including, the at least one pre-existing liability (60);
enrolling the user (42) in the rewards program using one or more modules that include a combination of hardware and software for processing or evaluating input data into or stored within each respective module wherein the user (42) receives credit from a system provider (52) that provides credit and facilitates collection and payments of funds and rewards;
transacting for goods or services (46) in a transaction (28) between the user (42) and the merchant (16) wherein the merchant (16) offers for sale, exchange, or barter, goods or services (46) to the user (42), and accepts credit from the user (42) as a form of payment for the goods or services (46);
providing rewards to the pre-existing liability holder (14) resulting from information received from a processing entity (50) as calculated by a system provider calculation module (24) based on the transaction (28) between the user (42) and the merchant (16) at a predetermined time after the transaction (28) for goods or services (46) is completed; and
using a holder calculation module (32) to manage each pre-existing liability holder user accounts (40); and to reduce the at least one pre-existing liability (60) in the pre-existing liability holder user accounts (40) by an amount corresponding to an amount of the rewards.

7. The method of using as pre-existing liability payment reward system (10) of claim 6, wherein establishing a rewards program (82) further comprises:
forming rules that govern transactions, transaction fund, and rewards funds; and
enrolling a system provider (52) in the rewards program.

8. The method of using a pre-existing liability payment reward system (10) of claim 6, further comprising:
    using the pre-existing tax liability holder (14) to establish the rewards program.

9. The method of using a pre-existing liability payment reward system (10) of claim 6, further comprising:
    using the pre-existing liability holder (14), the system provider (52), a system administrator (56), or a processing entity (50) to establish the rewards program.

10. The method of using a pre-existing liability payment reward system (10) of claim 6, wherein enrolling at least one pre-existing tax liability holder (14) further comprises:
    communicating with at least one holder communication module (38) to notify the pre-existing tax liability holder (14) of program availability; and
    forming an agreement with the pre-existing tax liability holder (14), the agreement operating to establish pre-existing tax liability holder (14) obligations with respect to the rewards program.

11. The method of using a pre-existing liability payment reward system (10) of claim 6, wherein enrolling at least one user (42) further comprises:
    notifying at least one potential user of rewards program availability;
    receiving application materials from at least one potential user;
    determining financial eligibility of at least one potential user (108); and
    enrolling at least one financially eligible potential user in the rewards program to define the at least one financially eligible potential user as an enrolled user.

12. The method of using a pre-existing liability payment reward system (10) of claim 11, wherein notifying at least one user (42) of program availability further comprises:
    notifying the at least one potential user of program availability via at least one property tax bill associated with the at least one user (42).

13. The method of using a pre-existing liability payment reward system (10) of claim 6, wherein transacting for goods or services (46) further comprises:
    determining geographical eligibility of a transaction (112) within a municipality, a state, or a county.

14. The method of using a pre-existing liability payment reward system (10) of claim 13, wherein determining geographical eligibility of a transaction (112) further comprises:
    defining a predefined geographical eligibility region (114);
    comparing a geographical position of a transaction with the predefined geographical eligibility region (116) to determine whether the geographical position of the transaction is within the predefined geographical eligibility region;
    determining whether the geographical position transaction (112) is within the predefined geographical eligibility region (120); and
    determining a reward type for the transaction.

15. The method of using a pre-existing liability payment reward system (10) of claim 14, further comprising:
    providing a standard reward if the transaction is not within he predefined geographical eligibility region; and
    providing a premium reward if the transaction is within the predefined geographical eligibility region.

16. The method of using a pre-existing liability payment reward system (10) of claim 6, wherein providing the reward further comprises:
    determining the amount of the transaction (128);
    determining the reward amount as a function of the amount of the transaction (130); and
    determining reward amount as a function of geographical eligibility of the transaction (132) within a municipality, a state, or a county.

17. The method of using a pre-existing liability payment reward system (10) of claim 16, wherein providing rewards to the pre-existing tax liability holder (14) further comprises:
    providing funds from the transaction to the processing entity (50);
    removing a predefined percentage of the funds corresponding to a predefined processing fee;
    providing remaining funds to the provider communication module (22) provided system provider (52);
    removing a predefined percentage of the funds corresponding to a predefined system provider fee;
    providing funds to the system communication module (34) of a system administrator (56);
    using the system calculation module (36) to associate the funds received from the system provider (52) with system administrator user accounts (58), whereafter the funds from the transaction become the rewards;
    removing a predefined percentage of the user rewards corresponding to a predefined system administrator fee;
    providing user rewards to the holder communication module (38) of the pre-existing liability (60) to the pre-existing tax liability holder (14); and
    notifying the user (42) of the reduction of the at least one pre-existing tax liability of pre-existing liability holder user accounts (40).

18. A method of using a pre-existing liability payment and reward system (10) comprising:
    establishing a rewards program (82);
    enrolling a pre-existing liability holder (14) in the rewards program, wherein the pre-existing liability holder (14) holds at least one pre-existing liability that is a financial liability owed by a user (42) to the pre-existing liability holder (14) because of a pre-existing relationship between the pre-existing liability holder (14) and the user (42) that existed prior to the user's enrollment in the rewards program, and wherein the pre-existing liability holder (14) has a plurality of pre-existing liability holder user accounts (40), with each respective pre-existing liability holder user account (40) including the at least one pre-existing liability;
    enrolling the user (42) in the rewards program using one or more modules, wherein the user (42) receives credit from a system provider (52) that provides credit and facilitates collection and payments of funds and rewards;
    transacting for goods or services (46) in a transaction (28) between the user (42) and a merchant (16) wherein the merchant (16), offers for sale, exchange, or barter, goods or services (46) to the user (42), and accepts the credit from user (42) provided by the system provider (52) as a form of payment for the goods or services (46);
    providing rewards to the pre-existing liability holder (14) resulting from information received from a processing entity (50) as calculated by a system provider calculation module (24) based on the transaction (28) between the user (42) and the merchant (16) at a predetermined time after the transaction (28) for goods or services (46) is completed; and
    using the holder calculation module (32) to manage each pre-existing liability holder user accounts (40); and to reduce the pre-existing liability (60) in the pre-existing liability holder user accounts (40) by an amount corresponding to an amount of the rewards.

19. The method of using a pre-existing liability payment and reward system (10) of claim 18 comprising:
   forming an agreement with the pre-existing liability holder (14), the agreement operating to establish pre-existing liability holder obligations with respect to the rewards program.

20. The method of using a pre-existing liability payment and reward system (10) of claim 18, wherein providing rewards to the pre-existing liability holder (14) further comprises:
   comprising:
      using a the pre-existing liability holder, the system provider (52), a system administrator (56), or a processing entity (50) to establish the rewards program;
      providing funds from the transaction to the processing entity (50);
      removing a predefined percentage of the funds corresponding to a predefined processing fee;
      providing remaining funds to a provider communication module (22) provided by the system provider (52);
      removing a predefined percentage of the funds corresponding to a predefined system provider fee;
      providing funds to a system communication module (34) of a system administrator (56);
      using the system calculation module (36) to associate the funds received from the system provider (52) with system administrator user accounts (58), whereafter the funds from the transaction become the rewards;
      removing a predefined percentage of the user rewards corresponding to a predefined system administrator fee;
      providing user rewards to the holder communication module (38) of the pre-existing liability to the pre-existing liability holder (14); and
      notifying the user (42) of the reduction of the pre-existing liability (60) of the pre-existing liability holder user accounts (40).

* * * * *

UNITED STATES PATENT AND TRADEMARK OFFICE
CERTIFICATE OF CORRECTION

PATENT NO. : 8,401,895 B2  Page 1 of 1
APPLICATION NO. : 12/156922
DATED : March 19, 2013
INVENTOR(S) : Weingarden It is certified that error appears in the above-identified patent and that said Letters Patent is hereby corrected as shown below:

In the Claims:

| | |
|---|---|
| Column 9; Claim 1; Line 3; | Please insert --a-- after of. |
| Column 9; Claim 1; Line 8; | Please delete "the" before the. |
| Column 9; Claim 1; Line 40; | Please delete "in" and insert --information--. |
| Column 10; Claim 2; line 6; | Please delete "operation" and insert --operative--. |
| Column 10; Claim 7; Line 62; | Please delete "as" and insert --a--. |
| Column 10; Claim 7; Line 65; | Please delete "fund" and insert --funds--. |
| Column 11; Claim 15; Line 59; | Please delete "he" and insert --the--. |
| Column 12; Claim 17; Line 12; | Please insert --by the-- after provided. |
| Column 13; Claim 20; Line 11; | Please delete "comprising". |
| Column 13; Claim 20; Line 12; | Please delete "a" after using. |

Signed and Sealed this
Second Day of July, 2013

Teresa Stanek Rea
*Acting Director of the United States Patent and Trademark Office*